United States Patent

[11] 3,631,422

[72] Inventors William F. Krajewski
Los Gatos;
Marco Padalino; David H. Paulson, both of San Jose, all of Calif.
[21] Appl. No. 795,920
[22] Filed Feb. 3, 1969
[45] Patented Dec. 28, 1971
[73] Assignee International Business Machines Corporation
Armonk, N.Y.

[54] SYSTEM FOR DETECTION OF DATA BY TIME INTERVAL MEASUREMENT
17 Claims, 14 Drawing Figs.

[52] U.S. Cl. ........................................................ 340/174.1 G
[51] Int. Cl. ........................................................ G11b 5/04
[50] Field of Search ........................................................ 340/174.1 B, 174.1 S, 174.1 H; 235/151.31

[56] References Cited

UNITED STATES PATENTS

| | | | |
|---|---|---|---|
| 3,439,331 | 4/1969 | Brown et al. | 340/146.1 |
| 3,488,663 | 1/1970 | Rosenblatt | 340/174.1 |
| 3,488,662 | 1/1970 | Uallee | 346/74 |
| 3,217,329 | 11/1965 | Gabor | 340/174.1 H |
| 3,337,858 | 8/1967 | Gillis | 340/174.1 H |
| 3,537,084 | 10/1970 | Behr | 340/174.1 H |

*Primary Examiner*—Stanley M. Urynowicz, Jr.
*Assistant Examiner*—Vincent P. Canney
*Attorney*—Fraser and Bogucki

ABSTRACT: A system is provided in which data processed in digitally encoded form is detected using an inverse algorithm of the encoding process and the predictable nature of errors which may be introduced by the processing media. In one example, a measurement of the time interval between each adjacent pair of data signal transitions derived from a magnetic recording media is adjusted to compensate for speed variations of the recording media, and the adjusted measurement is categorized according to the predictable nature of bit shift introduced by the recording media. Logic circuitry responds to each categorized time interval measurement to determine the data denoted thereby in terms of data detected from the immediately preceding time interval.

Patented Dec. 28, 1971

3,631,422

5 Sheets-Sheet 1

INVENTORS
WILLIAM F. KRAJEWSKI
MARCO PADALINO
BY DAVID H. PAULSON

Fraser and Bogucki
ATTORNEYS

INVENTORS
WILLIAM F. KRAJEWSKI
MARCO PADALINO
DAVID H. PAULSON
BY
Fraser and Bogucki
ATTORNEYS

INVENTORS
WILLIAM F. KRAJEWSKI
MARCO PADALINO
BY DAVID H. PAULSON

Fraser and Bogucki
ATTORNEYS

| PREVIOUSLY SELECTED STATE | NEW STATE AS DETERMINED BY PREVIOUSLY SELECTED STATE AND TIME INTERVAL MEASUREMENT | | | | | | | | | | DATA VALUE OF SELECTED STATE | STATE IDENTIFICATION |
|---|---|---|---|---|---|---|---|---|---|---|---|---|
| A | B | B | A | A | A | A | A | A | A | A | | START UP STATES |
| B | C | C | A | A | A | A | A | A | A | A | | |
| C | 2 | 3 | 3 | A | A | A | A | A | A | A | | |
| 1 | 2 | 2 | 3 | 3 | 3 | 4 | 5 | 5 | 8 | 8 | 01 | DATA EARLY |
| 2 | 2 | 3 | 3 | 4 | 4 | 5 | 6 | 7 | 7 | 8 | 1 | DATA NORMAL |
| 3 | 2 | 2 | 4 | 5 | 5 | 5 | 1 | 1 | 8 | 8 | 1 | DATA LATE |
| 4 | 5 | 5 | 6 | 6 | 8 | 8 | 8 | 8 | IMP | IMP | 0 | CLOCK EARLY |
| 5 | 5 | 6 | 6 | 7 | 7 | 8 | 9 | 9 | IMP | IMP | 0 | CLOCK NORMAL |
| 6 | 5 | 5 | 5 | 7 | 8 | 8 | 8 | IMP | IMP | IMP | 0 | CLOCK LATE |
| 7 | 2 | 2 | 3 | 3 | 3 | 5 | 5 | 8 | 8 | 8 | 01 | DATA EARLY |
| 8 | 2 | 3 | 3 | 4 | 4 | 5 | 6 | 7 | 7 | 8 | 01 | DATA NORMAL |
| 9 | 2 | 2 | 4 | 4 | 5 | 5 | 5 | 7 | 8 | 8 | 01 | DATA LATE (FROM CLOCK ON) |
| | $T_1$ | $T_2$ | $T_3$ | $T_4$ | $T_5$ | $T_6$ | $T_7$ | $T_8$ | $T_9$ | $T_{10}$ | | |
| | 0.6T TO 1.04T | 1.04T TO 1.15T | 1.15T TO 1.25T | 1.25T TO 1.35T | 1.35T TO 1.46T | 1.46T TO 1.54T | 1.54T TO 1.68T | 1.68T TO 1.85T | 1.85T TO 1.90T | ≥1.90T | | |
| | MEASURED TIME INTERVAL CATEGORIES OR RANGES | | | | | | | | | | | |

SEQUENTIAL LOGIC TABLE

FIG. — 7

*INVENTORS*
WILLIAM F. KRAJEWSKI
MARCO PADALINO
DAVID H. PAULSON
BY
Fraser and Bogucki
*ATTORNEYS*

INVENTORS
WILLIAM F. KRAJEWSKI
MARCO PADALINO
DAVID H. PAULSON

BY Fraser and Bogucki
ATTORNEYS

SYSTEM FOR DETECTION OF DATA BY TIME INTERVAL MEASUREMENT

BACKGROUND OF THE INVENTION

1. Field of the Invention

The present invention relates to data detection systems, and more particularly to systems for detecting digital data represented by transitions of a data signal within a succession of bit cell intervals.

2. History of the Prior Art

Presently known data processing and related operations frequently require that digital data be encoded such as by modulating an electrical signal for purposes of storage, transmission or other processing of the data. The data may be recovered by use of appropriate detection circuitry which responds to the signal as transmitted or as derived from a storage media.

Where data is to be stored by recording on a magnetic medium, a number of conventional recording techniques can be used including NRZ, NRZI, phase modulation and double-frequency encoding (frequency modulation). Such techniques involve the generation of a data signal which represents the data by transitions thereof within a succession of bit cell intervals. A write head responds to each transition of the data signal to reverse the sense of magnetization of the recording medium along a track thereof. The data signal may be effectively reconstructed or regenerated for purposes of further processing or detection of the data by employing a read head to sense the magnitude and polarity of the magnetic recording.

One technique commonly used to detect data employs a variable frequency oscillator to generate a reference clock signal in phase-locked relation with pulses derived from the data signal transitions. The reference clock which may be of sawtooth waveform is applied to a binary trigger to alternately open and close an associated gate during different portions of each bit cell interval. Data or "one" pulses at the centers of the bit intervals are gated to the output as "ones" while "zero" clock pulses at the edges of the bit intervals are blocked.

Conventional detection arrangements, such as of the pulse gating type just described, detect data in generally analog fashion and are accordingly limited in their versatility. In detection by pulse gating the only determination made is whether a pulse falls within a "one window" or a "zero window" as provided by the gate. Each bit cell interval is looked at individually without any consideration being given as to the informational content of adjacent intervals. This is particularly significant when considering bit shift and other problems because the read head characteristically affects the time position of more than one transition during sensing. Thus bit shift of a given transition is dependent on the relative values of the time intervals between the transition and the adjacent transitions. Accordingly a detection system which considers the relationship between a succession of bit cells rather than each cell individually would be advantageous, at least in this respect. Such a system would moreover be advantageous from the standpoint of the detection and correction of errors in the detection process.

BRIEF SUMMARY OF THE INVENTION

Arrangements in accordance with the invention detect data by use of an inverse algorithm of the encoding process and the predictable nature of errors which may be introduced by the processing media from which the data signal is derived. The inverse algorithm is implemented by logic circuitry to provide an essentially digital type of decoding process in which previously detected data values are considered.

In one preferred arrangement of a detection system in accordance with the invention, the time interval between each adjacent pair of the transitions of a data signal derived from a magnetic recording medium is measured using a pulse generator and associated resettable counter. The pulse count representing each time interval measurement is multiplied by a periodically updated correction factor to compensate for long term variations in the speed of the magnetic recording medium relative to a read head which derives the data signal therefrom. Each pulse count as adjusted by the correction factor is categorized according to the predictable nature of bit shift which may be introduced by the read head by determining the particular one of a plurality of predetermined ranges of value into which the count is determined to fall. Sequential logic circuitry responds to the particular category chosen for the measured time interval to determine the data value most likely denoted thereby in terms of the data detected from the immediately preceding time interval. The logic circuitry includes a plurality of different states, each of which represents a particular data value in terms of whether the transition at the trailing edge of the time interval which will produce the value is early, on time or late. A particular one of the states is selected in response to each time interval, and the state selected for each interval is used to determine the data most likely denoted by the immediately following interval.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 7 is a sequential logic table illustrating the various logical operations performed by the system of FIG. 5.

DETAILED DESCRIPTION

Figure 1:
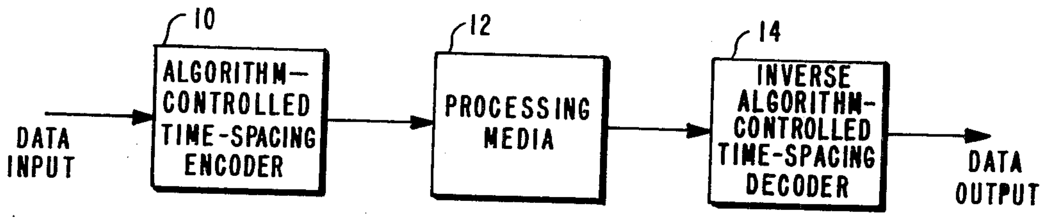
FIG. 1 is a generalized block diagram of an arrangement employing a data detection system in accordance with the invention.

Arrangements in accordance with the invention, as illustrated generally in FIG. 1, provide for the recording, transmitting or other appropriate processing of digital data by controlling the time-spacings between the various transitions of a generated data signal in accordance with a predetermined encoding algorithm, then detecting the data after the processing thereof by measurement of the time-spacings using the inverse of the encoding algorithm. Data to be encoded is applied to an algorithm-controlled time-spacing encoder 10 to modulate the time positions of successive transitions of a data signal generated thereby. The generated data signal is applied to processing media 12 where the data may be stored such as by magnetic storage media, transmitted or otherwise processed as desired. The data signal from the processing media 12 is applied to an inverse algorithm-controlled time-spacing decoder 14 where the time-spacings between the transitions of the data signal are measured to detect the data carried thereby using an essentially inverse form of the algorithm employed by the encoder 10. Errors of a type commonly introduced into the data signal by the processing media 12 are considered by the decoder 14 which detects the data in terms of the known characteristics of the processing media 12 as well as the particular encoding algorithm employed.

Figure 2:
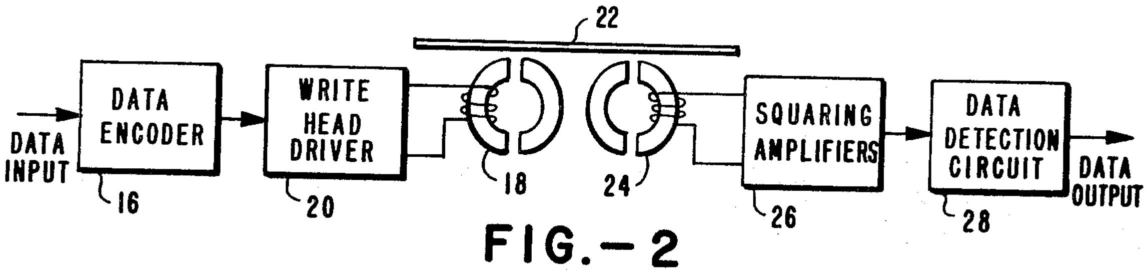
FIG. 2 is a block diagram of a conventional magnetic recording channel with which detection systems in accordance with the invention may be used.

FIG. 2 provides an example of one form which the the FIG. 1 arrangement may assume and in which the processing media 12 comprises magnetic recording media. While the invention is described in connection with FIG. 2 and hereafter in terms of its use with magnetic recording, it should be understood that the data signal carrying the data to be detected may be derived from other types of processing media such as communications channel. In the FIG. 2 arrangement data which is to be magnetically stored is applied to an encoder 16 which corresponds to the encoder 10 of FIG. 1 and which modulates the generation of a data signal in accordance with the data using an appropriate encoding algorithm. The generated data signal is applied to a magnetic write head 18 via a head driver 20 to record a representation of the data signal on a magnetic medium 22. The medium 22 may comprise a magnetic strip, drum, disk or tape, the particular form thereof being unimportant to the present invention.

When the stored data is to be retrieved and detected, a magnetic read head 24 is used to derive or regenerate the data signal from the magnetic recording. The derived data signal is squared by amplifiers 26 and passed to a detection circuit 28 for recovery of the data carried thereby. The detection circuit 28 corresponds to the decoder 14 of FIG. 1 to the extent that it may detect the data in accordance with the invention using the inverse of the encoding algorithm. A better appreciation of the invention may be had, however, by first considering one prior art system typically employed as the data detection circuit 28 of FIG. 2 and which is shown in block diagram form in FIG. 3.

Figures 4A, 4B, 4C, 4D, 4E, 4F, 4G:
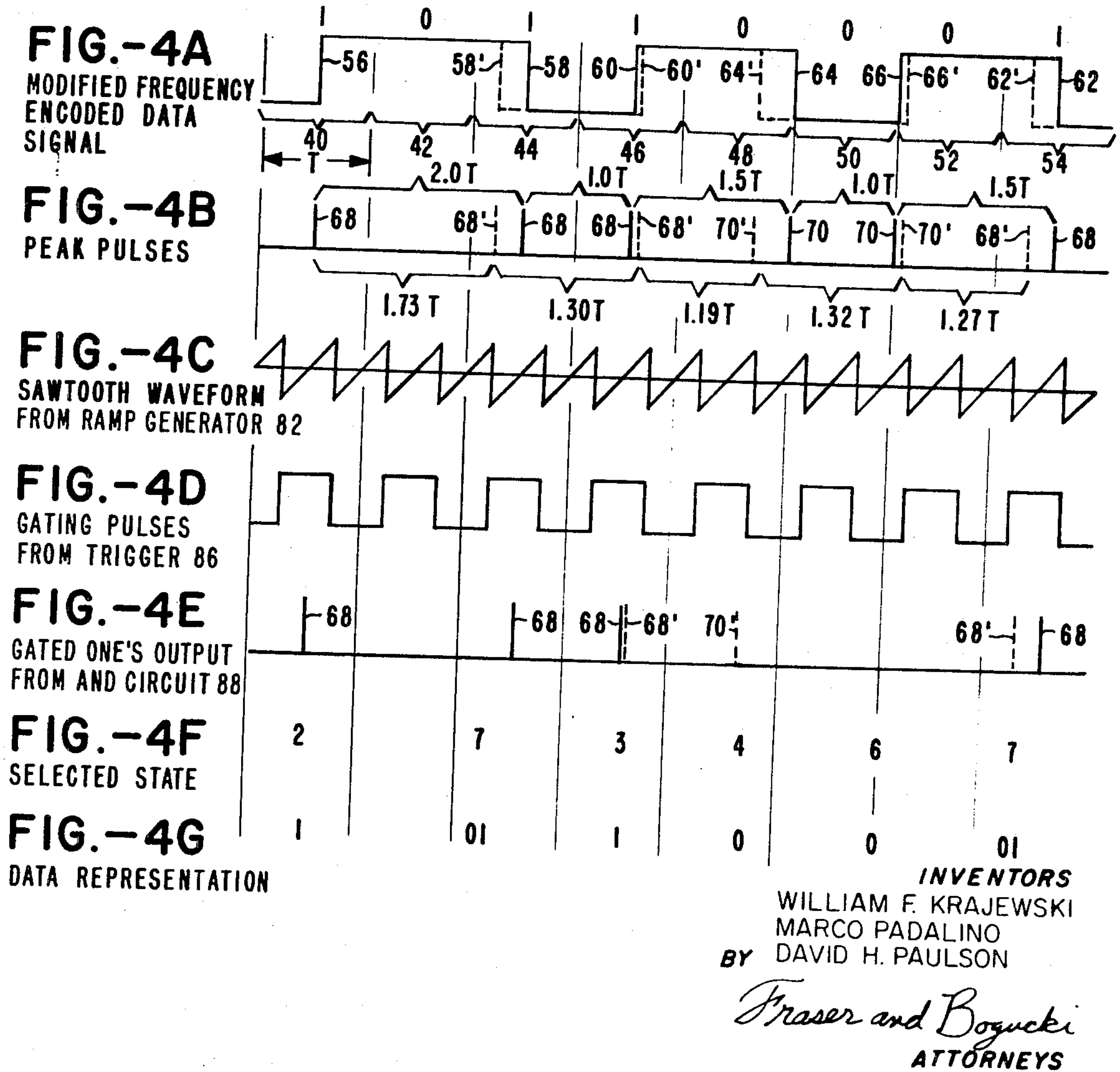
FIGS. 4A–4G are waveforms useful in explaining the operation of and the differences between the FIG. 3 system and systems in accordance with the invention.
Figure 3:
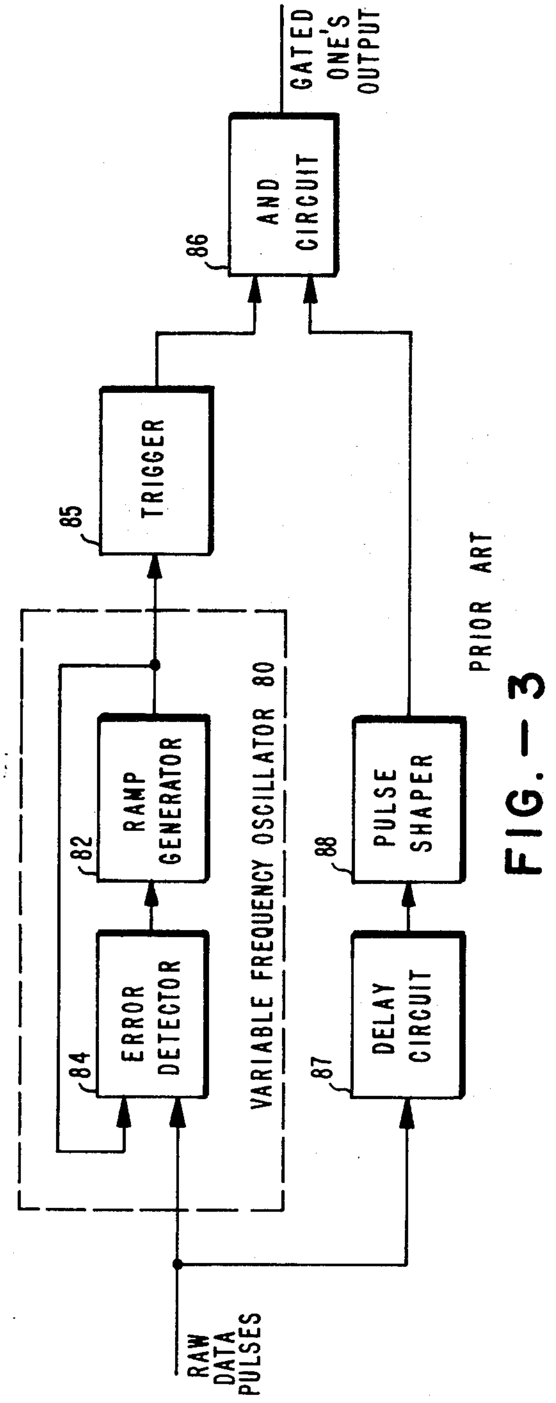
FIG. 3 is a block diagram of a prior art detection system of the type typically employed in an arrangement such as that of FIG. 2.

The operation of the prior art detection system of FIG. 3 and the operation of systems in accordance which the invention are hereafter described in connection with a data signal which has been encoded using modified frequency modulation and which is shown in FIG. 4A. It should be understood, however, that encoding of the modified frequency type is presented for purposes of illustration only and that other types of encoding such as double frequency, NRZ, NRZI and phase modulation can also be used in accordance with the invention. In modified frequency encoding which is described in a copending application, Ser. No. 653,784, filed July 17, 1967, and assigned to the assignee of the present invention, a data or "one" transition is written at the center of each bit cell interval which is to represent a "one." Clock or "zero" transitions are written at the leading edge of each bit representing a "-zero" except where the particular cell in question is immediately preceded by a cell in which a "one" is written. Accordingly as seen in FIG. 4A the bit cell intervals 40, 44, 46 and 54 which represent a "one" have data transitions 56, 58, 60 and 62 respectively at the centers thereof. The bit cell intervals 50 and 52 which represent "zeros" have clock transitions 64 and 66 respectively at the leading edges thereof. The "zero" bit cell intervals 42 and 48 do not have clock transition at the leading edges thereof, however, since each is preceded by a "one" cell. It will be seen that modified frequency encoding is similar to the double frequency and NRZI types in that a transition is present at the center of each bit cell interval representing a "one." This fact may be used by the prior art arrangement of FIG. 3 to detect the data carried by the signal of FIG. 4A.

A peak pulser (not shown in FIG. 3) responds to the various data and clock transitions of the data signal of FIG. 4A to generate corresponding peak pulses as shown in FIG. 4B. The pulses 68 may be labeled "one" pulses as these are to be gated to the output of the FIG. 3 arrangement to the exclusion of the "zero" pulses 70. A variable frequency oscillator 80 responds to the peak pulses 68 and 70 to generate a reference clock of generally sawtooth waveform in phase-locked relation therewith as shown in FIG. 4C. The variable frequency oscillator 80 includes a ramp generator 82 for providing the sawtooth waveform and an error detector 84 which maintains the desired phase relationship between the pulses and the sawtooth waveform by adjusting the sawtooth frequency so that each peak pulse coincides with a zero crossing of the sawtooth waveform. In the event a peak pulse precedes the corresponding zero crossing of the sawtooth waveform, the error detector 84 generates a correction signal of appropriate value and having a sense or polarity which will increase the sawtooth frequency. Similarly a peak pulse which follows the corresponding zero crossing of the sawtooth waveform results in the generation of a correction signal to decrease the sawtooth frequency by an appropriate amount.

A binary trigger 85 responds to each flyback or negative-going excursion of the sawtooth waveform from the ramp generator 82 to generate a sequence of gating pulses as shown in FIG. 4D. The bilevel output of the trigger 85 rises to a high level in response to the first flyback of the sawtooth waveform within each bit cell interval and drops to a low level in response to the second flyback of the sawtooth waveform within each interval. The output of the binary trigger 85 enables one of the inputs of a gate in the form of an AND-circuit 86 whenever the output is high. The other input of the AND-circuit 86 is coupled to receive the peak pulses via a delay circuit 87, which compensates for the delay provided by the generator 82, the error detector 84 and the trigger 85, and a pulse shaper 88 which shapes the peak pulses.

The gating pulses from the trigger 85 open the gate provided by the AND-circuit 86 to incoming peak pulses during one-half of each bit cell interval beginning at a point one-quarter of the distance through the interval and terminating at a point three-quarters of the distance through the interval. Peak pulses which appear at the second input of the AND-circuit 86 in the presence of a gating pulse are accordingly gated to the output while all other pulses are excluded. The output of the AND-circuit 86 is illustrated in FIG. 4E. As shown, the data pulses 68 occur in the presence of a gating pulse and are gated to the output as "ones". The clock or "zero" pulses 70 do not occur in the presence of gating pulses and are blocked from the output.

The data signal illustrated in FIG. 4A is ideal, at least in the sense that the various data and clock transitions are shown as occurring exactly at the centers and leading edges respectively of the various bit cell intervals. In actual practice the various transitions are typically shifted in time relative to their ideal or desired locations among other reasons due to the superposition phenomenon commonly referred to as bit shift or peak shift. Peak shift is commonly introduced by the magnetic transducing head used to sense the recording on the magnetic medium and results from the fact that the data is typically packed very closely on the recording medium. The head therefore spans at least several adjacent bit cell intervals as the medium is moved relative thereto, and the magnetic transitions are effectively displaced in time so as to tend to equalize the time-spacings between the transitions as they are sensed. The nature of the shift typically depends upon the particular characteristics of the read head used and on the relative sizes of the time intervals between each transition and the adjacent transitions on the opposite sides thereof. The greatest amount of shift normally occurs at a transition having adjacent time intervals of considerably different value while little if any shift normally occurs where the adjacent time intervals are substantially equal in value.

Peak shifts which might typically occur in the data signal of FIG. 4A through use of a particular read head are illustrated in dashed outline therein. The data transition 56 within the first bit cell interval 40 is assumed not to have undergone any shift for purposes of the present example. The data transition 58 is shown by the corresponding dashed outline 58′ as having been shifted to the left by a considerable amount due to the existence of time intervals on the right and left thereof which are respectively approximately equal to the length of a bit cell interval and twice the length of a bit cell interval. The time interval between the data and clock transitions 60 and 64 of value equal to approximately one and one-half times the length of a bit cell interval results in the transitions 60 and 64 being respectively shifted to the right and to the left as shown by the dashed outlines 60′ and 64′. The clock and data transitions 66 and 62 are assumed to undergo similar shifts as shown by the dashed outlines 66′ and 62′. The new peak pulses 68′ and 70′ which respectively correspond to the shifted data and clock pulses of FIG. 4A are illustrated in FIG. 4B.

The data pulse 68 occurring within the first bit cell interval 40 is gated to the output as before without any problems. The data pulse 68′ occurring within the third bit cell interval 44, however, has been shifted to the left by more than 25 percent of the bit interval length so as to lie outside of the corresponding gating pulse within the interval. The absence of a pulse at the output during the third bit interval 44 accordingly represents an error in the detection of the encoded data. The data pulse 68′ within the fourth bit cell interval 46 which has been shifted only slightly falls within the corresponding gating pulse from the trigger 85 and therefore appears at the output. A further problem arises in the generation of the clock pulse 70′ within the fifth bit cell interval 48 as a result of the relatively extensive shift of the clock transition 64. The clock pulse 70′ has been shifted more than 25 percent of the length of a bit interval and accordingly falls within the gating pulse so as to be erroneously passed to the output as a detected "one". The data pulse 68′ within the last bit cell interval 54 still lies within the gating pulse of that interval and is therefore provided to the output as a "one" pulse.

Systems which detect encoded data by pulse gating as described above provide a substantially analog type of decoding in which each bit cell interval is individually examined to determine only whether a peak pulse likes within or outside of the "one window" provided by the gating pulses. Although the data content of adjacent bit cell intervals is considered during the encoding process, particularly where modified frequency or similar encoding schemes are employed, no attempt is made during detection to consider the adjacent intervals. Nor is any attempt made during detection to consider the adjacent intervals from the standpoint of the possible nature of bit shift or the patterns of bit shift which are likely to result from the particular read head used, although the data content of adjacent bit cell intervals is highly determinative of the direction and extent to which bit shift may occur within a given bit cell interval. The rather limited flexibility of such conventional detection systems is significant not only from the standpoint of the detection process itself but also from the standpoint of the ability to detect and correct errors once they have occurred.

In accordance with the invention, data encoded such as in the manner of FIG. 4A is detected in essentially digital fashion using an inverse algorithm of the encoding process and the predictable nature of errors such as bit shift which may be introduced by a read head having known characteristics. The prior art form of data detection circuit 28 of FIG. 2 as shown in FIG. 3 is replaced by a system of the type shown in block diagram form in FIG. 5 which measures the time intervals between adjacent transitions of the data signal. Each time interval measurement is preferably adjusted such as by a speed correction logic circuit 90 shown in FIG. 5 prior to being fed to a sequential logic circuit 91 for detection of the data denoted thereby. As described in detail hereafter, the sequential logic circuit 91 of FIG. 5 categorizes each time interval measurement in terms of the predictable patterns of bit shift typically introduced by the magnetic read head. The categorized time interval measurement is then examined both in terms of the value thereof and in terms of the previously selected one of a plurality of different states to select that one of the states representing the data value most likely denoted by the measured time interval.

Figure 5:
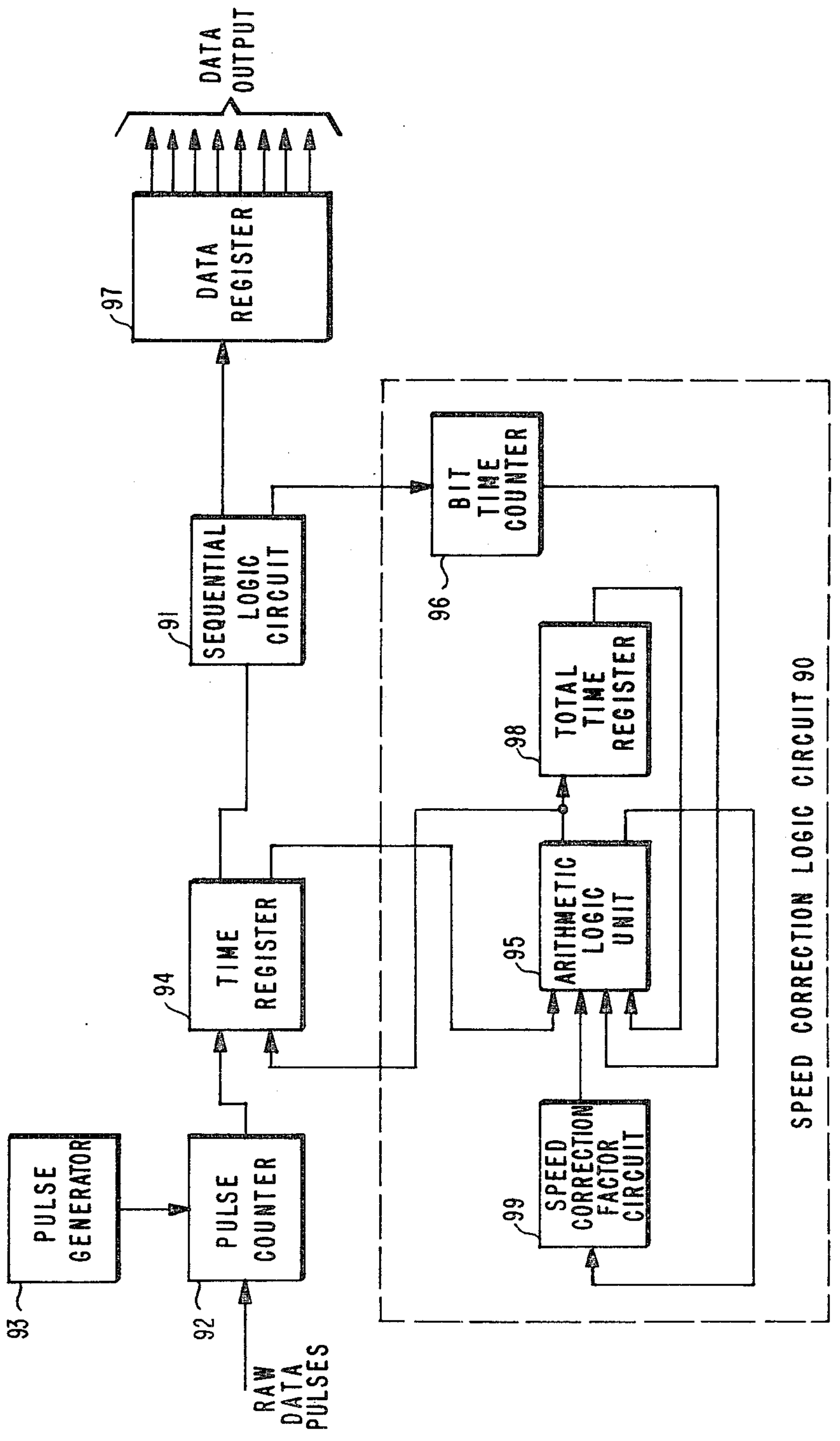
FIG. 5 is a block diagram of one form of detection system in accordance with the invention which may be used in an arrangement such as that of FIG. 2.

Referring to FIG. 5, raw data pulses in the form of peak pulses derived from the data signal and which correspond in time to the various data signal transitions are applied to a pulse counter 92. The counter 92 measures each time interval between adjacent transitions of the data signal by counting the number of pulses generated by an associated pulse generator 93 during the time interval between each pair of the peak pulses. The peak pulse at the trailing edge of each time interval to be measured resets the pulse counter 92 transferring the count stored therein to a time register 94 and enabling the pulse counter 92 to begin the counting of pulses from the generator 93 during the next time interval. The total count representing each measured time interval as stored in the time register 94 is applied to logic circuitry within an arithmetic logic unit 95 for multiplication by a periodically updated correction factor stored therein to compensate for long term speed variations in the recording medium. The count as adjusted by the correction factor is then reinserted in the time register 94 and transferred to the sequential logic circuit 91 for detection of the data denoted thereby. The various data bits as detected by the sequential logic circuit 91 are applied to advance a bit time counter 96 along with being assembled into eight-bit words or bytes in a data register 97.

The bit time counter 96 counts the number of bits detected by the sequential logic circuit 91 until a predetermined count level, such as 40, is reached. When the predetermined count level is reached, an output indication is provided to the arithmetic logic unit 95 and the counter 96 is reset so as to again count the number of detected data bits until the predetermined count level is reached. As the bit time counter 96 counts detected data bits a total time register 98 sums the pulse counts from the time register 94 as they are adjusted by the arithmetic logic unit 95. Each time the bit time counter 96 reaches the predetermined count to provide an output indication to the arithmetic logic unit 95, the total time register 98 is simultaneously reset and the count accumulated therein transferred to the arithmetic logic unit 95. The total time register 98 accordingly provides a periodic representation of the length of predetermined number of bit cell intervals of the data signal. Logic circuitry within the arithmetic logic unit 95 responds to each output indication from the bit time counter 96 to divide the predetermined bit count by the accumulated count within the total time register 98. The quotient thereof which represents the ratio of bits to time interval measurement is applied to a speed correction factor circuit 99 to update the old correction factor and provide a new correction factor to the arithmetic logic unit 95.

The speed correction logic circuit 90 of FIG. 5 adjusts each time interval measurement to compensate for long term variations in the speed of the magnetic recording medium. Correction for momentary variations in an otherwise relatively stable system is avoided by sampling the time interval measurements over a plurality of bit cell intervals to arrive at an average figure for the time interval measurements. The new correction factor is then determined by comparing the average figure with a figure representing the desired or nominal speed of the magnetic recording medium. Thus if the total count provided by the pulse counter 92 over the predetermined number of bit intervals exceeds the desired or nominal count over the same number of intervals, a correction factor is provided to decrease each time interval count by an appropriate amount. Similarly when the speed of the recording medium is higher than it should be the correction factor is such as to increase each time interval measurement by an appropriate amount.

Upon observing the modified frequency encoded data signal of FIG. 4A it will be noted that if the length of each bit cell interval is designated T, then three different time intervals are possible, namely 1.0T, 1.5T and 2.0T. It will further be noted that those time intervals which are ideally of value 1.0T are almost never less than this value but can be greater due to bit shift of one or both of the transitions defining the interval. Similarly those time intervals which ideally are of value 2.0T are seldom if ever greater than this value but can be less due to bit shift. Time intervals which are ideally of value 1.5T can be greater than this value due to bit shift but are usually less.

Figure 6:
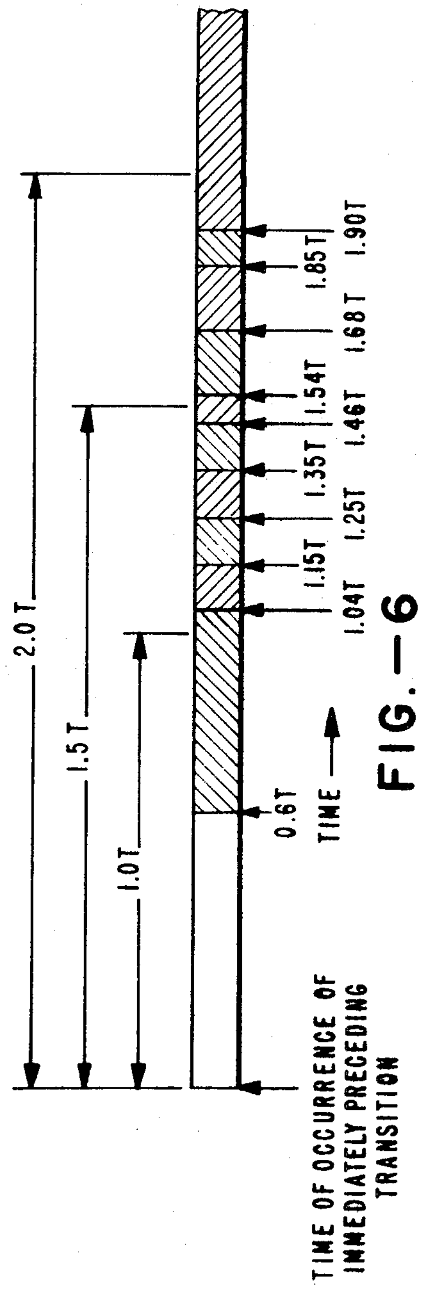
FIG. 6 is a timing diagram useful in explaining the operation of the system of FIG. 5.

These observations are utilized in accordance with the invention to establish a timing diagram as shown in FIG. 6. The timing diagram encompasses all possible values for the measured time intervals and is divided into different ranges or categories of possible values using the known characteristics of the magnetic read head. In the case of the particular read head which the diagram of FIG. 6 represents, a time interval which is ideally of value 1.0T will be measured so as to fall within a range of 0.6T–1.04T if virtually no bit shift is present. Similarly a time interval of ideal value 1.5T will fall within a range of 1.46T–1.54T, and a time interval of ideal value 2.0T will fall within a range of >1.90T. If bit shift does occur, the nature of the shift and therefore the particular data value which the measured time interval most likely represents can be accurately determined in terms of which of the intervening ranges the time interval measurement is determined to be included in. This fact is utilized in accordance with the invention to detect the data denoted by each time interval measurement in terms of the data detected from the immediately preceding time interval and the particular category or time interval range which is determined to include the time interval measurement.

The process of detection is greatly simplified if little or no peak shift is in fact present. In such a situation it is only necessary that the previously detected data be known and that each time interval be determined to be of value 1.0T, 1.5T or 2.0T. Referring to the data signal of FIG. 4A, for example, the data content of the bit intervals 42 and 44 can be determined as "-zero one" by knowing that the first interval 40 represented a "one" and that the measured time interval is of value 2.0T as shown in the upper portion of FIG. 4B. The presence of a "one" in the interval 44 plus the measurement of a time interval between the transition 58 and 60 of value 1.0T determines that a "one" is present in the bit cell interval 46. The next measured time interval of value 1.5T plus the knowledge that the bit interval 46 contained a "one" provides for the determination that the bit cell interval 48 contains a "zero". The subsequent time intervals of value 1.0T and 1.5T may be utilized in similar fashion to determine that the bit cell interval 50 represents a "zero" and that the intervals 52 and 54 represent a "zero" and a "one" respectively.

Accordingly in the absence of any bit shift the measured time intervals are limited to three different values, and such values can be considered in terms of the previously detected data to determine the data using a relatively simple logic scheme. Thus if the time interval in question is determined to be of value 1.0T, the data is determined to be a "one" if the previous bit cell interval contained a "one" or a "zero" if the previous bit cell interval contained a "zero". If the measured time interval is of value 1.5T the data content is determined to be a "zero" if a "one" was previously detected and a "zero one" if a "zero" was previously detected. A time interval measurement of 2.0T always indicates that a "zero one" is present.

The detection process becomes considerably more involved, however, where bit shift of the various data signal transitions is possible. In such situations each time interval measurement must be considered in terms of the nature of the immediately preceding interval and the possible data content of the interval which immediately follows. Detection of the data is therefore greatly facilitated if each measured time interval is represented both in terms of the data value detected therefrom and in terms of whether the trailing edge of the interval was early, on time or late.

FIG. 7 illustrates a sequential logic or truth table derived in conjunction with the timing diagram of FIG. 6 to detect modified frequency encoded data subject to peak shift. The logic table of FIG. 7 includes states A, B and C for starting the detection system of FIG. 5. Thereafter states 1–9 are used, each of which represents a particular data value in terms of whether the trailing edge of the time interval which produced that value was early, on time (normal) or late. The data content of each time interval measurement is determined by considering the particular category or range of the measurement as determined in accordance with the diagram of FIG. 6 and the particular state selected in response to the immediately preceding time interval measurement. The various time interval categories are identified as $T_1$–$T_{10}$ in FIG. 7 and hereafter for convenience.

The sequential logic circuit 91 shown in FIG. 5 implements the table of FIG. 7 by categorizing each time interval measurement according to the diagram of FIG. 6 and providing a plurality of different states and associated logic circuitry responsive to each selected category and to the previously selected state to select a new state. Operation of the detection system is begun with state A being assumed by the sequential logic circuit. The data to be detected is normally preceded by a burst of "ones" or "zeros" to facilitate initial synchronization of the system with the incoming data signal. In the event of an initial burst of "ones" the data signal has a data transition at the center of each bit cell interval thereof, and the detection system measures a sequence of time intervals of value 1.0T. In this connection it could be noted that an initial sequence of 1010101 would be better for modified frequency encoding since the resulting period of $1/f$=2.0T is unique to this code, whereas periods of 1.0T can occur as all "ones" or all "zeros". Referring to the sequential logic table of FIG. 7 the system responds to the first time interval measurement of 1.0T to step from state A to state B. The next time interval of 1.0T results in the stepping to state C and the following time interval of 1.0T results in the stepping to state 2. The remaining time intervals of 1.0T in the initial sync burst result in the system remaining at state 2.

If it is assumed that the data transition 56 within the first bit cell interval 40 shown in FIG. 4A represents the last "one" in the initial sync burst, then the sequential logic circuit is in state 2 when the interval of 2.0T is measured between the data transition 56 and the following data transition 58. The sequential logic circuit responds to the interval of 2.0T by stepping to state 8 to indicate that the data transition 58 was normal and that a "zero one" has been detected. In response to the interval of 1.0T between the data transitions 58 and 60 the sequential logic circuit steps to state 2 indicating that the data transition 60 was normal and that a "one" has been read. The following time interval of 1.5T results in the sequential logic circuits stepping to state 5 to indicate that the clock transition 64 was normal and that a "zero" is present in the bit cell interval 48. The sequential logic circuit responds to the next time interval of 1.0T by remaining in state 5 to indicate that the clock transition 66 is normal and that the interval 50 contains a "-zero." In response to the next time interval of 1.5T the sequential logic circuit steps from state 5 to state 8 indicating that the data transition 62 is normal and that a "zero one" is present in the bit intervals 52 and 54.

It will be seen from the above discussion that the sequential logic circuit alternates between states 2, 5 and 8 in the absence of bit shift. Where bit shift is present as shown by the dashed lines in FIG. 4A additional states are used. The measured time intervals are as shown in the lower portion of FIG. 4B, and the states which are selected therefrom and the data values represented thereby are respectively illustrated in FIGS. 4F and 4G. Again it is assumed that the sequential logic circuit is in state 2 upon the occurrence of the data transition 56 within the first bit cell interval 40. The sequential logic circuit responds to the old state 2 and to the time interval measurement of 1.73T shown in FIG. 4B by stepping to state 7 to indicate that a "zero one" has been detected and the the shifted data transition 58° is early relative to nominal timing. The next time interval measurement of 1.30T results in the stepping to state 3 to indicate that a "one" is present and that the shifted data transition 60′ is late. The subsequent time interval of 1.19T directs the sequential logic circuit to state 4 to read a "zero" and indicate that the clock transition 64′ is early. The following time interval of 1.32T directs the sequential logic circuit to state 6 to declare that a "zero" is present and that the shifted clock transition 66′ is late. The final time interval of 1.27T causes the sequential logic circuit to select state 7 indicating that a "zero one" is present and that the shifted data transition 62′ is early relative to nominal timing.

The spaces labeled "IMP" in the sequential logic table of FIG. 7 are impossible states which the sequential logic circuit cannot assume unless error is present. These states may be implemented to provide an indication of the presence of error if they are assumed.

The detection system of FIG. 5 measures and categorizes the time intervals between data signal transitions using a pulse generator and associated resettable counter. An alternative technique for measuring and categorizing the time intervals and which instead employs a ramp generator and plural voltage comparators is illustrated by the detection system of FIG. 8. Raw data pulses generated in response to the various data and clock transitions of the data signal are applied to a single-shot multivibrator 100 to reset an associated ramp generator 102 and initiate the generation of an increasing voltage therein. The voltage at the ramp generator 102 output upon resetting is a direct function of the time interval which has occurred since the immediately preceding resetting and accordingly provides a representation or measurement of each data signal time interval. This voltage is coupled to ground through a plurality of serially coupled resistors 104, 106, 108, 110 and 112 so as to provide related voltages of different values at the various nodes 114, 116, 118 and 120 between resistors. The voltages at nodes 114, 116, 118 and 120 are compared with reference voltages of selected value by a plurality of voltage comparators 122, 124, 126 and 128. The comparators are of the type which provide an output whenever the voltage at the associated node exceeds that of the associated reference voltage. The output of the highest comparator 122 comprises the time interval category $T_{10}\geq 1.90T$ while the outputs of the lower comparators comprise the lower inputs of a plurality of AND-circuits 130, 132 and 134. The upper inputs to the AND-circuits 130, 132 and 134 are respectively coupled through inverters 136, 138 and 140 to the next higher comparators 122, 124 and 126. It will be noted that the circuitry responsive to time intervals which fall into the categories $T_3$–$T_8$ has been omitted for the sake of simplicity.

The various reference voltages are chosen such that the inputs to the comparators successively and sequentially reach equality beginning with the lowest comparator 128 and rising to the highest comparator 122 as the ramp generator 102 voltage increases from zero to its maximum value. Moreover, the reference voltages are constantly being adjusted to compensate for speed variations in the incoming raw data pulses. This adjustment provides an averaging effect since the raw data pulse timing variation is related to "slow speed" variations within the mechanical system of the recording channel and such an adjustment would improve the system's accuracy and performance. Thus as the ram generator voltage grows after being reset, the voltage at the node 120 becomes equal to $V_{REF\ 1}$ at a time$\geq$0.6T thereafter. The resulting output from the comparator 128 enables the lower input to the AND-circuit 134, which input remains enabled so long as the voltage at node 120 is at least equal to $V_{REF\ 1}$. If the ramp generator 102 is reset less than$\geq$1.04T after the immediately preceding resetting, the voltage at node 118 remains less than $V_{REF\ 2}$ and the absence of an output from the comparator 126 is inverted by the inverter 140 to enable the upper input to the AND-circuit 134 and indicate that a time interval of category $T_1$ 0.6T –1.04T) has been measured. If the ramp generator 102 is not reset until sometime after 1.04T however, the voltage 118 assumes a value at least equal to $V_{REF\ 2}$, and the resulting output from the comparator 126 is inverted to disable the upper input of the AND-circuit 134 and thereby prevent a $T_1$ indication for the remainder of the time interval being measured. The inverters 136, 138 and 140 accordingly prevent an output by the associated AND circuit whenever the node voltage at the input of the associated comparator becomes at least equal to the reference voltage at the other comparator input. The various AND-circuits 130, 132 and 134 are successively enabled and disabled in an upward direction as the ramp generator 102 voltage increases until the ramp generator is reset by the next data signal transition, the particular AND circuit which is enabled upon resetting providing an indication of the category into which the measured time interval falls. If the measured interval is greater than 1.90T, the output of the comparator 122 directly provides the desired indication $T_{10}$.

Figure 8:
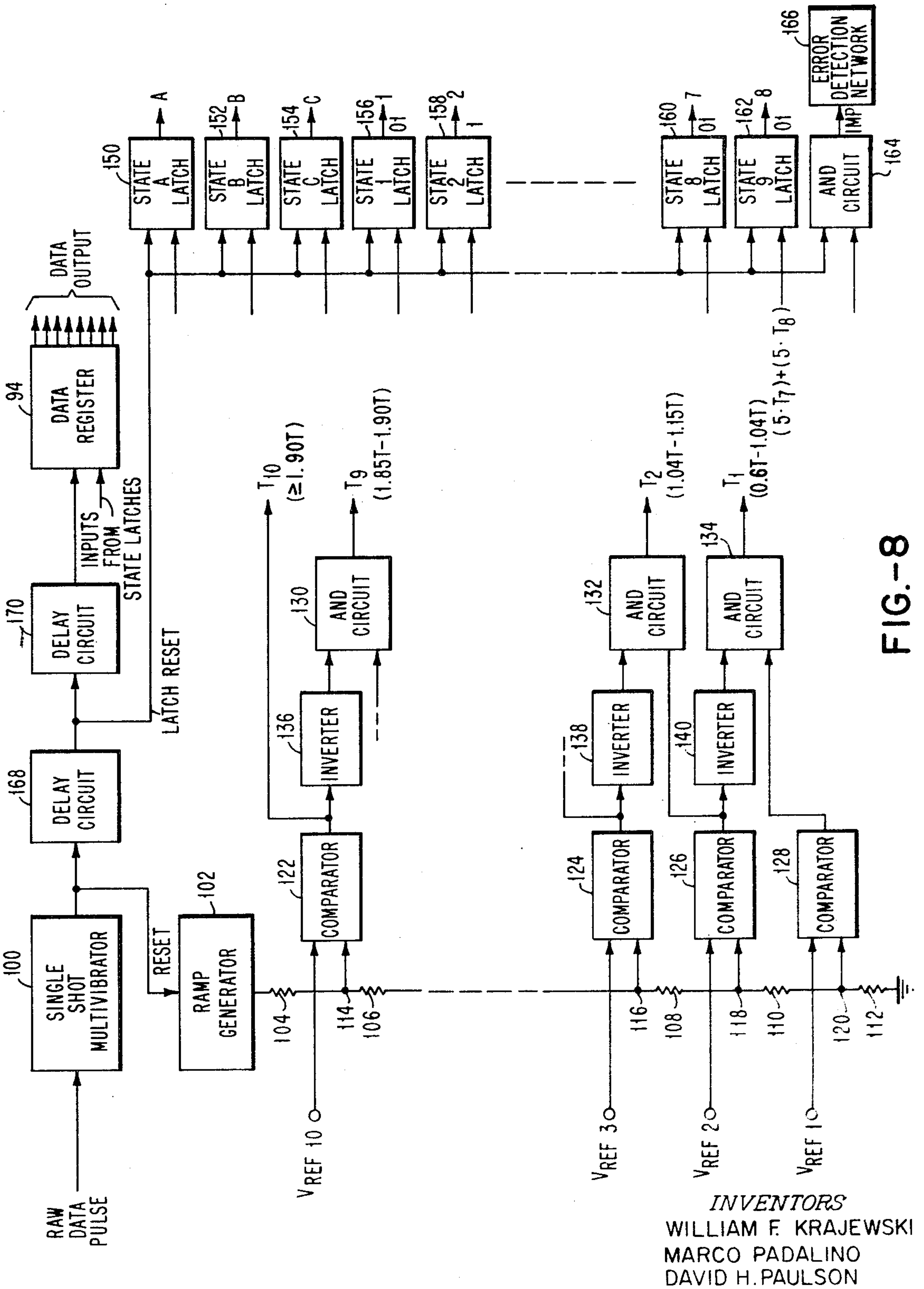
FIG. 8 is a block diagram of an alternative form of detection system in accordance with the invention which may be used in an arrangement such as that of FIG. 2 and which is useful in explaining the various logical operations depicted in the table of FIG. 7.

The logical operations depicted in the table of FIG. 7 are performed by the sequential logic circuit 91 shown in FIG. 5 as previously mentioned. Circuitry which may be used to implement part of the sequential logic circuit 91 and which is shown in FIG. 8 includes a plurality of electronic bistable devices such as latches or flip-flops, each of which represents a different one of the possible states. In the FIG. 8 arrangement, states A, B and C are provided by latches 150, 152 and 154 while states 1, 2, 8 and 9 (intervening states 3–7 have been omitted for simplicity) are provided by latches 156, 158, 160 and 162. The impossible states shown in FIG. 7 are represented by an AND-circuit 164, an output from which is fed to an error detection network 166. The state latches are coupled to be reset by each multivibrator 100 pulse as delayed by a circuit 168 and to be set by the various state and time interval category combinations depicted in the FIG. 7 table. The combinations which will set the state 9 latch 162, for example, are shown in FIG. 8, the various combinations for the remaining latches being omitted for reasons of clarity. Thus, state 5 and the category $T_7$ or state 5 and the category $T_8$ will result in the setting of the latch 162. Each of the various other combinations depicted in the FIG. 7 table will select the proper state by setting the latch representing that state. The output of each set latch is provided to the data register 97 along with the pulse from the multivibrator 100 as delayed by the circuit 168 and a further delay circuit 170 for assembly of the detected bits into eight-bit words or bytes.

In addition to the various state latches the sequential logic circuit 91 (shown in FIG. 5) includes appropriate logic circuitry (not shown in FIG. 8) for setting an appropriate one of the latches in response to the previously selected state and the measured time interval category. Such circuitry may assume any appropriate form, and according to on example comprises a plurality of AND OR and inverter circuits. Each AND circuit represents one of the possible combinations depicted in the FIG. 7 table with one input thereof coupled to the output of the latch representing the state of the combination and another input thereof coupled to the AND-circuit 130, 132 or 134 or the comparator 122 representing the time interval category of the combination. The simultaneous enabling of both inputs of one of the AND circuits results in an output being passed via an OR circuit to set the latch representing the new state to be selected. The delay circuit 168 allows the latch representing the previously selected state to remain set while the circuitry in the left-hand portion of FIG. 8 generates a representation of the measured time interval category. The logic circuitry then responds to the set latch and category representation as the latches are reset to set the latch representing the new state immediately thereafter. The multivibrator 100 pulses which are also used by the data register 97 are further delayed by the circuit 170 to allow for the time required to set the new state latch and pass the output thereof to the data register.

It will be appreciated that in detection systems in accordance with the invention the informational content of each bit cell interval and the possible bit shift which may occur therein are considered in terms of the adjacent bit cell intervals as well as the interval itself. Referring to FIG. 4B, by way of example, it is noted that a time interval of 1.73T is measured between the data transitions 68 and 68'. It is known that the data transition 68 within the first bit cell interval 40 represents a "one" and that such transition is on time. It is furthermore known that the peak pulse immediately following the pulse 68 within the interval 40 will not be displaced by more than 2.0T therefrom and may be less if bit shift is present. In measuring an interval of 1.73T which is actually closer to 1.5T than to 2.0T, the sequential logic circuit must determine whether the interval has been decreased from an interval of 2.0T representing "zero one" or increased from an interval of 1.5T representing a "zero". In making this determination the logic circuit looks ahead and determines the probable nature of bit shift within the bit cell interval 44 in terms of data which might follow.

If the peak pulse 68′ within the bit interval 44 properly belongs at the leading edge of the interval 44 to indicate that a "zero" is present in the bit interval 42, then the following peak pulse would either occur at the leading edge of the interval 46 to indicate that "zeros" are present in the intervals 44 and 46 or at the center of the interval 46 to indicate that the interval 46 represents a "one" and that the interval 44 represents a "zero". In either case the time interval between the peak pulse 68′ in the bit interval 44 and the immediately following peak pulse would not be any larger than the time interval between the peak pulse 68′ and the preceding pulse 68 within the bit interval 40, and the pulse 68′ would be assumed to lie either at the leading edge of the interval 44 or to be left thereof. In such a situation the measured time interval between the peak pulse 68 in the interval 40 and the following pulse 68′ would have to be 1.5T or less. Since the measured interval is instead 1.73T the sequential logic circuit eliminates the possibility that the peak pulse 68′ has been displaced to the right from the leading edge of the interval 44. Since data values of "zero" and "one" respectively within the intervals 42 and 44 would place the peak pulse 68′ at the center of the interval 44 or to the left thereof to provide a time interval measurement of 2.0T or less, the sequential logic circuit concludes that the peak pulse 68′ is early and that the intervals 42 and 44 respectively represents a "zero" and a "one".

In the detection system of FIG. 5, the data rate or rate at which the successive time intervals of the data signal may be presented for detection is a function of the highest obtainable pulse frequency of the generator 93 as well as the number of pulses which are to be generated for each minimum time interval of value 1.0T to achieve acceptable resolution. While pulse generators having a frequency on the order of 100 to 150 megacycles are generally contemplated, 200-megacycle pulses are within the state of the art. A pulse frequency of 200 megacycles provides for the generation of 50 to 100 pulses per bit cell interval or minimum time interval 1.0T while at the same time permitting a data rate such that each bit cell interval is considerably less than 1 microsecond.

Sequential logic circuitry in accordance with the invention has been shown and described in terms of the detection of data encoded by modified frequency modulation. It will be appreciated by those skilled in the art, however, that data encoded in other fashions such as by use of double frequency encoding, NRZ, NRZI, phase modulation or even ternary coding can be detected using a system in accordance with the invention by appropriate modification of the sequential logic circuitry. In the case of double frequency or phase modulation the logic circuitry required is somewhat simplified compared to that required for modified frequency modulation. Ternary coding on the other hand requires more complex logic circuitry. NRZ and NRZI require relatively simple logic circuitry, but at the same time and artificial clock is needed.

While the invention has been particularly shown and described with reference to preferred embodiments thereof, it will be understood by those skilled in the art that various changes in form and details may be made therein without departing from the spirit and scope of the invention.

What is claimed is:

1. A system for detecting data represented by transitions of a data signal, the data signal being provided by processing means, comprising:
- means responsive to the data signal for providing a measurement of the time interval between each adjacent pair of the data signal transitions; and
- means operative to assume any one of a plurality of different states, each of the states representing a particular data value, said means including means responsive to each time interval measurement for selecting a state representative of the data value which the time interval measurement most likely denotes in terms of the previously selected state and the value of the time interval measurement.

2. A system in accordance with claim 1, wherein the means for selecting a state is responsive to the previously selected state and the particular one of a plurality of predetermined ranges of value into which the time interval measurement is determined to fall, the ranges of value being established in accordance with characteristic shifts in the time positions of the data signal transitions caused by the processing means, and wherein each state of the plural state means represents a particular data value in terms of the relationship between actual and ideal time interval measurements which denote the data value.

3. A system in accordance with claim 1, wherein the time interval measurement means includes means for adjusting the measured value of each time interval to compensate for variations in the rate of occurrence of the signal transitions relative to a nominal rate.

4. A system in accordance with claim 3, wherein the measured value adjusting means comprises means for multiplying the measured value of each time interval by a correction factor to provide the adjusted value thereof, and means responsive to the adjusted time interval values and to the number of data values represented thereby for periodically updating the correction factor in accordance with the number of bits per unit of time interval measurement.

5. In a system in which digital data bits are detected by measurement of the time intervals between transitions of a data signal, an arrangement for adjusting the measured time interval values to compensate for long term variations in the rate of occurrence of the data signal transitions relative to a nominal rate comprising:
- means responsive to the measured time intervals for multiplying the measured value of each time interval by a correction factor to provide an adjusted value thereof;
- means responsive to the detection of a predetermined number of data bits and to the adjusted values of time interval measurements from which the predetermined number of bits is detected for calculating the ratio of detected data bits to units of adjusted time interval measurement; and
- means responsive to each calculation of said ratio for multiplying the correction factor by said ratio to provide an updated correction factor.

6. An arrangement in accordance with claim 5, wherein the means for calculating said ratio includes counting means coupled to be advanced by each detection of a data bit, said counting means providing an output indication and being reset whenever the count therein reaches a predetermined value, means for summing the adjusted values of the time interval measurements simultaneously with the detection of data bits therefrom until reset, and means responsive to each output indication from the counting means for dividing the predetermined count value by the sum of the adjusted values of the time interval measurement in the summing means to provide said ratio and resetting the summing means.

7. A digital data processing system comprising the combination of:
- means responsive to digital data to be processed for generating a data signal, the time-spacings of successive identifiable portions of which are determined in accordance with an encoding algorithm;
- means responsive to the data signal for processing said signal; and
- means responsive to the processed data signal for detecting the digital data carried thereby, and including means for measuring the time-spacings of the identifiable portions of the data signal and means responsive to the measured time-spacings for detecting the digital data denoted thereby in terms of a decoding algorithm which is an inverse implementation of the encoding algorithm, the time-spacing measuring means comprising counting means for counting during the interval between the occurrence of each successive pair of the identifiable portions of the data signal to provide a count representative of each measured time-spacing.

8. A digital data processing system comprising the combination of:

means responsive to digital data to be processed for generating a data signal, the time-spacings of successive identifiable portions of which are determined in accordance with an encoding algorithm;

means responsive to the data signal for processing said signal; and means responsive to the processed data signal for detecting the digital data carried thereby, and including means for measuring the time-spacings of the identifiable portions of the data signal and means responsive to the measured time-spacings for detecting the digital data denoted thereby in terms of a decoding algorithm which is an inverse implementation of the encoding algorithm, the means for detecting the digital data in terms of a decoding algorithm including means for temporarily storing a representation of data detected from measured time-spacing of the data signal and means for determining the data denoted by each measured time-spacing in terms of the value of the time-spacing and the stored representation of data detected from the immediately preceding measured time-spacing.

9. A digital data processing system comprising the combination of:

means responsive to digital data to be processed for generating a data signal, the time-spacings of successive identifiable portions of which are determined in accordance with an encoding algorithm;

means responsive to the data signal for processing said signal, the processing means altering random ones of the data signal time-spacings in a manner which is predictable from known characteristics of the processing means; and means responsive to the processed data signal for detecting the digital data carried thereby, and including means for measuring the time-spacings of the identifiable portions of the data signal and means responsive to the measured time-spacings for detecting the digital data denoted thereby in terms of a decoding algorithm which is an inverse implementation of the encoding algorithm including means for categorizing each measured time-spacing in terms of the predictable nature of alterations introduced by the processing means.

10. A digital data processing system in accordance with claim 9, wherein the processing means includes means for recording a magnetic representation of the data signal and electromagnetic transducing means for sensing the recorded representation to regenerate the data signal, said transducing means time shifting various ones of the data signal portions in a manner which is predictable from known characteristics of the transducing means.

11. A digital data processing system in accordance with claim 10, wherein the means responsive to the measured time-spacings for detecting the digital data includes means for adjusting the measured value of each time-spacing to compensate for speed variations of the magnetic recording means relative to the transducing means.

12. In an arrangement in which binary data is carried by processing means in the form of transitions of a data signal at the centers and edges of various ones of a succession of bit cell intervals thereof, a system for detecting the binary data comprising:

means responsive to the data signal for measuring the time interval between each adjacent pair of the transitions thereof;

means responsive to each time interval measurement for choosing that one of a plurality of different categories which is determined to include the interval, each of the categories comprising a different portion of a range of possible values of the time interval measurements and being established in accordance with the predictable nature of shifts in the time positions of data signal transitions which may result from the processing means;

means having a plurality of different states and operative to assume any one of the states which is selected; and means responsive to each chosen category and to the state concurrently assumed by the plural state means for selecting one of the states thereof in accordance with a predetermined logic scheme, each state when selected representing a particular data value in terms of the relationship between the chosen category and the category which should ideally be chosen to provide said data value.

13. A system in accordance with claim 12, wherein the different states of the plural state means are defined by bistable devices, each of which normally assumes a first state and is coupled to be switched into a second state by the means for selecting one of the states.

14. A system in accordance with claim 12, further including means responsive to each time interval measurement for adjusting the value thereof to compensate for long term variations in the rate of occurrence of the data signal transitions.

15. A system in accordance with claim 14, wherein the time-interval-measuring means includes pulse-generating means, counting means coupled to be reset by each data signal transition and to count pulses from the pulse-generating means during the time intervals between transitions, and means for temporarily storing the pulse count accumulated by the counting means at the end of each time interval, and wherein the means for adjusting the value of each time interval measurement comprises means for multiplying each temporarily stored pulse count by a correction factor to provide an adjusted pulse count, second counting means for counting decoded data bits provided by the selection of states of the plural state means, said second counting means providing an output indication and being reset whenever a predetermined count level is reached, resettable summing means for summing the adjusted pulse counts concurrently with the counting of data bits by the second counting means, means responsive to each output indication from the second counting means for dividing the predetermined count level of the second counting means by the sum of the adjusted pulse counts and resetting the summing means, and means for multiplying the correction factor by the quotient provided by the dividing means.

16. A system in accordance with claim 12, wherein the time-interval-measuring means includes means having a plurality of nodes and responsive to the data signal transitions for providing a voltage at each node which is directly related to the time interval between each adjacent pair of the data signal transitions, means for providing a plurality of reference voltages, separate means responsive to the voltage at each node and to a different one of the reference voltages for providing an output whenever the node voltage is at least equal to the reference voltage, and separate means responsive to different adjacent pairs of the means for providing an output for generating a signal indication whenever an output is present at one of the adjacent pairs of output providing means and absent from the other one of the output providing means.

17. A system in accordance with claim 16, wherein the means for providing a voltage at each of a plurality of nodes comprises means responsive to the data signal for generating a pulse upon the occurrence of each data signal transition, ramp-generating means coupled to be reset by each pulse from the pulse-generating means and to generate a voltage of constantly increasing value between each adjacent pair of data signal transitions, and a plurality of impedances serially coupled between the ramp generating means and a reference terminal, the junction between adjacent pairs of the impedances defining the nodes.

* * * * *